(12) United States Patent (10) Patent No.: US 12,612,341 B2
Komai et al. (45) Date of Patent: Apr. 28, 2026

(54) METHOD FOR MANUFACTURING HONEYCOMB STRUCTURE

(71) Applicant: NGK INSULATORS, LTD., Nagoya (JP)

(72) Inventors: Yukari Komai, Toyokawa (JP); Koji Motoki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 20 days.

(21) Appl. No.: 18/602,165

(22) Filed: Mar. 12, 2024

(65) Prior Publication Data

US 2024/0327304 A1 Oct. 3, 2024

(30) Foreign Application Priority Data

Mar. 30, 2023 (JP) .................................. 2023-056775

(51) Int. Cl.
  *C04B 38/06* (2006.01)
  *C04B 35/10* (2006.01)
  (Continued)

(52) U.S. Cl.
  CPC .......... *C04B 38/0009* (2013.01); *C04B 35/10* (2013.01); *C04B 35/62655* (2013.01);
  (Continued)

(58) Field of Classification Search
  CPC ........................................ C04B 38/0006–0009
  See application file for complete search history.

(56) References Cited

U.S. PATENT DOCUMENTS

| | | |
|---|---|---|
| 2004/0051196 A1 | 3/2004 | Otsuka et al. |
| 2020/0306742 A1 | 10/2020 | Kodama et al. |
| 2022/0024822 A1* | 1/2022 | Kuchibhotla ......... F01N 3/2803 |

FOREIGN PATENT DOCUMENTS

| | | |
|---|---|---|
| CN | 111747751 A | 10/2020 |
| JP | 2007-507667 A | 3/2007 |

(Continued)

OTHER PUBLICATIONS

Kou et al. New insight in crosslinking degree determination for crosslinked starch. Carbohydrate Research 458-459 (2018) 13-18. (Year: 2018).*

(Continued)

*Primary Examiner* — Erin Snelting

(74) *Attorney, Agent, or Firm* — BURR PATENT LAW, PLLC

(57) ABSTRACT

A method for manufacturing a honeycomb structure includes preparing a honeycomb formed body by extruding a green body comprising a ceramic raw material, a pore-forming material, a binder and a dispersion medium through a die that defines opening shapes of the plurality of cells; drying the honeycomb formed body to obtain a honeycomb dried body; and firing the honeycomb dried body to obtain a honeycomb fired body in which a thickness of the partition walls is 50 μm or more and 210 μm or less, and a porosity of the partition walls is 45% to 60%; wherein the pore-forming material contains crosslinked starch and an acrylic polymer, and the green body contains 1.0 parts by mass or more of crosslinked starch with the proviso that a P content is less than 0.2 parts by mass, with respect to 100 parts by mass of the ceramic raw material.

8 Claims, 5 Drawing Sheets

(51) Int. Cl.
  C04B 35/626 (2006.01)
  C04B 35/64 (2006.01)
  C04B 38/00 (2006.01)

(52) U.S. Cl.
  CPC ............ C04B 35/64 (2013.01); C04B 38/067 (2013.01); *C04B 2235/3217* (2013.01); *C04B 2235/6021* (2013.01)

(56) References Cited

FOREIGN PATENT DOCUMENTS

| | | |
|---|---|---|
| WO | 2005/033037 A2 | 4/2005 |
| WO | 2017/095916 A1 | 6/2017 |

OTHER PUBLICATIONS

Ratnayake et al. Pea Starch: Composition, Structure and Properties â A Review. Starch 54 (2002) 217-234. (Year: 2002).*
Chinese Office Action (with English translation) dated Feb. 15, 2025 (Application No. 202410308093.8).
Ma Tiecheng, *Chinese Technology* (2nd Edition), China Industrial Publishing House, Aug. 2013, pp. 143-144 (4 pages).
Chinese Office Action (Application No. 202410308093.8) dated May 28, 2025 (with English translation) (17 pages).

* cited by examiner

100

106

103

104

Exhaust gas

Exhaust gas

METHOD FOR MANUFACTURING HONEYCOMB STRUCTURE

CROSS REFERENCE TO RELATED APPLICATIONS

The present invention claims the benefit of priority to Japanese Patent Application No. 2023-56775 filed on Mar. 30, 2023 with the Japanese Patent Office, the entire contents of which are incorporated herein by reference in its entirety.

FIELD OF THE INVENTION

The present invention relates to a honeycomb structure and a method for manufacturing the same.

BACKGROUND OF THE INVENTION

Honeycomb structures are used as filters that collect particulate matter in exhaust gas emitted from internal combustion engines such as diesel engines, and as carriers for catalysts that purify toxic gas components such as CO, HC, and NOx.

Generally, a honeycomb structure comprises an outer peripheral side wall and partition walls disposed on the inner peripheral side of the outer peripheral side wall and partitioning a plurality of cells that form flow paths from a first end surface to a second end surface. A honeycomb structures can be manufactured by kneading a raw material composition obtained by appropriately adding a ceramic raw material, a pore-forming material, a binder, a dispersion medium, and various additives to form a green body, and then preparing a honeycomb formed body by extrusion molding the green body through a die that defines a predetermined cell structure, and then cutting this honeycomb formed body into a predetermined length, then drying, and then firing it.

In recent years, with the tightening of exhaust gas regulations, stricter PM emission standards (PN regulations: particle matter number regulations) have been introduced, and filters are required to have high PM collection performance (PN high collection efficiency). Further, catalyst carriers are also required to lower their heat capacity so that they can be heated quickly to the catalyst's activation temperature. On the other hand, honeycomb structures are also required to have low pressure loss when exhaust gas passes through them, making it increasingly difficult to develop filters that can meet market demands. In order to obtain a honeycomb structure that satisfies such required performance, in addition to "thinning", which involves reducing the thickness of the partition walls of a honeycomb structure, studies are underway on "high porosity", which further increases the porosity of the partition walls compared to conventional methods (Patent Literature 1).

However, as the walls of honeycomb structures have become thinner, the extrusion molding pressure required to extrude the green body through an extremely narrow die slot has also increased, which resulted in reaching the limit of extrusion molding machines. Therefore, techniques for lowering the extrusion molding pressure are also required. In connection with this, Patent Literature 2 discloses that when an amylose ratio in the starch added to the raw material composition is high, the fluidity improves and the molding pressure decreases. In particular, it is disclosed that the extrusion molding pressure can be reduced when the amylose:amylopectin ratio is 40:60 to 80:20.

PRIOR ART

Patent Literature

[Patent Literature 1] Japanese Patent Application Publication No. 2007-507667
[Patent Literature 2] WO 2017/095916

SUMMARY OF THE INVENTION

Starch is useful as a component to obtain high porosity honeycomb structures. Therefore, it was considered effective to add starch at the blending ratio of amylose and amylopectin described in Patent Literature 2 when manufacturing a honeycomb structure with thin walls and high porosity. However, even if the extrusion molding pressure could be reduced by adding starch with an adjusted blending ratio of amylose and amylopectin to the raw material composition, the strength of the honeycomb structure manufactured thereby was not sufficient. In particular, honeycomb structures with thinner walls and higher porosity tend to have lower strength, so it would be advantageous if this problem could be solved.

The present invention has been created in view of the above circumstances, and in one embodiment, an object is to provide a method for manufacturing a honeycomb structure having thin walls, high porosity, and excellent strength without placing an excessive burden on an extrusion molding machine. Further, in another embodiment, an object is to provide a honeycomb structure having thin walls, high porosity, and excellent strength.

The inventors of the present invention made extensive studies to solve the above problems and found that it is effective to use a combination of an acrylic polymer and crosslinked starch as a pore-forming material. The present invention was completed based on this finding and is exemplified as below.

(1. Method for Manufacturing a Honeycomb Structure)

[Aspect 1]

A method for manufacturing a honeycomb structure comprising an outer peripheral side wall and partition walls disposed on an inner peripheral side of the outer peripheral side wall, the partition walls partitioning a plurality of cells forming flow paths from a first end surface to a second end surface, the method comprising:

preparing a honeycomb formed body by extruding a green body comprising a ceramic raw material, a pore-forming material, a binder, and a dispersion medium through a die that defines opening shapes of the plurality of cells;

drying the honeycomb formed body to obtain a honeycomb dried body; and firing the honeycomb dried body to obtain a honeycomb fired body in which a thickness of the partition walls is 50 μm or more and 210 μm or less, and a porosity of the partition walls is 45% to 60%;

wherein the pore-forming material in the green body comprises crosslinked starch and an acrylic polymer, and the green body comprises 1.0 parts by mass or more of crosslinked starch with the proviso that a P content is less than 0.2 parts by mass, with respect to 100 parts by mass of the ceramic raw material.

[Aspect 2]

The method according to aspect 1, wherein the green body comprises 1.0 parts by mass or more of the crosslinked starch with the proviso that the P content is 0.1 parts by mass or less, with respect to 100 parts by mass of the ceramic raw material.

[Aspect 3]

The method according to aspect 1, wherein the green body comprises 1.0 parts by mass or more of the crosslinked starch with the proviso that the P content is 0.05 parts by mass or less, with respect to 100 parts by mass of the ceramic raw material.

[Aspect 4]

The method according to any one of aspects 1 to 3, wherein the P content in the honeycomb structure is less than 0.2% by mass.

[Aspect 5]

The method according to any one of aspects 1 to 3, wherein the P content in the honeycomb structure is 0.1% by mass or less.

[Aspect 6]

The method according to any one of aspects 1 to 3, wherein the P content in the honeycomb structure is 0.05% by mass or less.

[Aspect 7]

The method according to any one of aspects 1 to 6, wherein the green body comprises 0.5 parts by mass or more of an acrylic polymer with respect to 100 parts by mass of the ceramic raw material.

[Aspect 8]

The method according to any one of aspects 1 to 7, wherein the ceramic raw material is a cordierite-forming raw material.

(2. Honeycomb Structure)

[Aspect 1]

A honeycomb structure, comprising an outer peripheral side wall and partition walls disposed on an inner peripheral side of the outer peripheral side wall, the partition walls partitioning a plurality of cells forming flow paths from a first end surface to a second end surface, wherein a thickness of the partition wall is 50 μm or more and 210 μm or less, a porosity of the partition walls is 45% to 60%, a P content in the honeycomb structure is 0.01% by mass or more and less than 0.2% by mass, and an isostatic breaking strength is 1.0 MPa or more.

[Aspect 2]

The honeycomb structure according to aspect 1, wherein an upper limit of the P content in the honeycomb structure is 0.1% by mass or less.

[Aspect 3]

The honeycomb structure according to aspect 1, wherein an upper limit of the P content in the honeycomb structure is 0.05% by mass or less.

[Aspect 4]

The honeycomb structure according to any one of aspects 1 to 3, wherein the outer peripheral side wall and the partition walls comprise cordierite.

According to an embodiment of the present invention, a honeycomb structure with thin walls, high porosity and excellent strength can be manufactured with high productivity without placing an excessive burden on an extrusion molding machine. The honeycomb structure can be suitably used as a filter or a catalyst carrier, and is particularly useful as a filter that requires high collection performance (high PN collection efficiency) or a catalyst carrier that requires a high temperature increase rate.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Honeycomb Structure>

In one embodiment, the honeycomb structure according to the present invention is provided as a wall-through type or wall-flow type honeycomb structure. There are no particular restrictions on the use of the honeycomb structure. For example, it can used in various industrial applications such as heat sinks, filters (for example, GPF, DPF), catalyst carriers, sliding parts, nozzles, heat exchangers, electrical insulation members, and parts for semiconductor manufacturing equipment. Among these, it can be suitably used as a filter that collects particulate matter contained in exhaust gas from internal combustion engines, boilers, and the like, or as a catalyst carrier for exhaust gas purification catalysts. In particular, the porous honeycomb structure can be suitably used as an exhaust gas filter and/or a catalyst carrier for automobiles.

Figure 1:
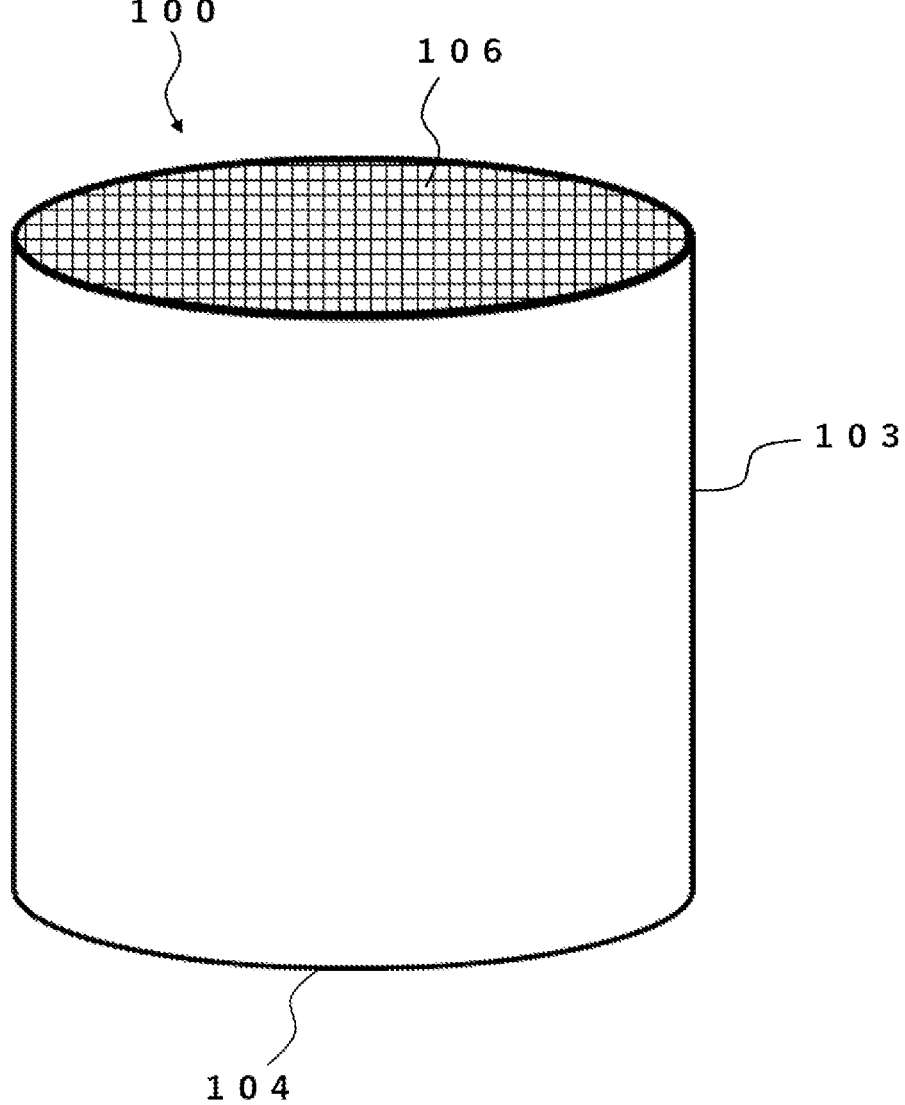
FIG. 1 is a perspective view schematically showing a wall-through type honeycomb structure.
Figure 2:
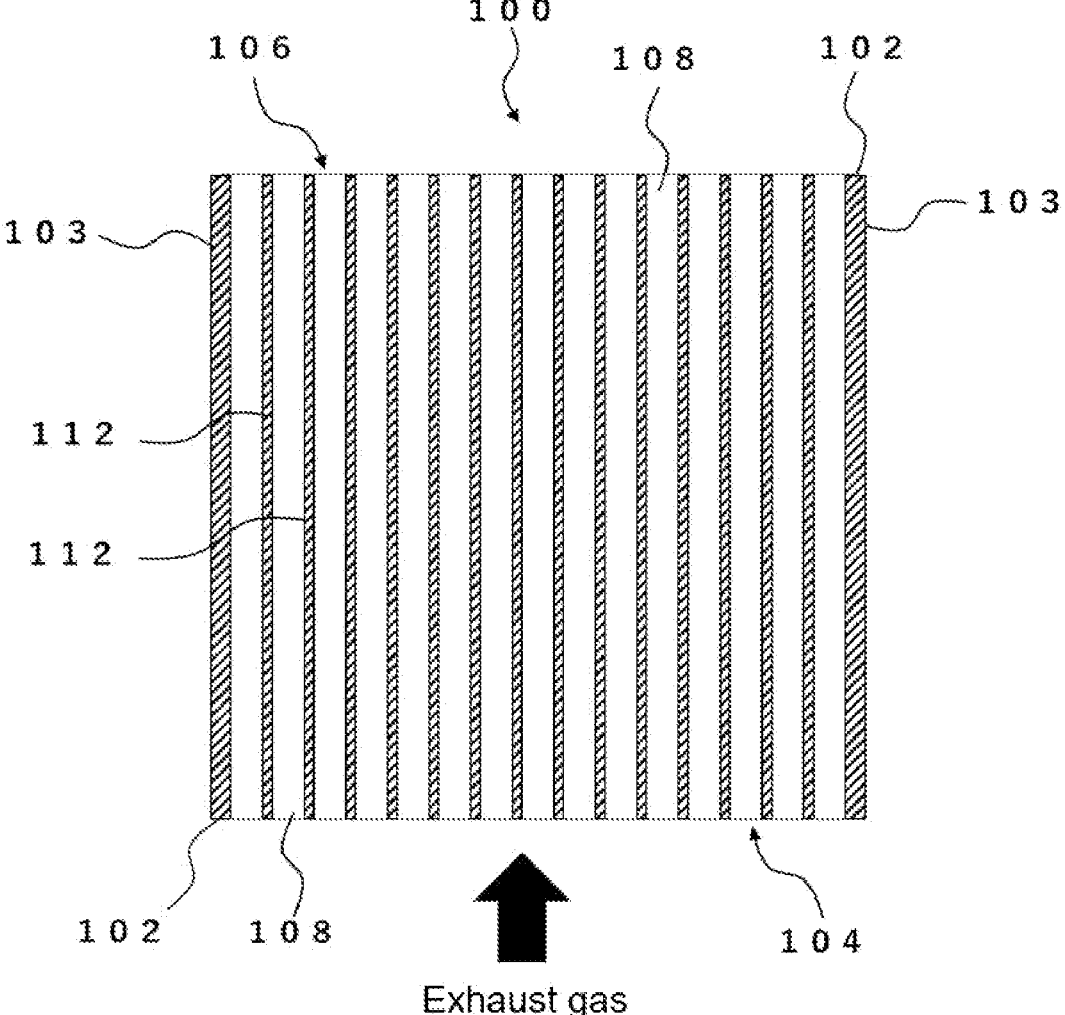
FIG. 2 is a schematic cross-sectional view of a wall-through type honeycomb structure when observed in a cross-section parallel to the direction in which the cells extend.

FIGS. 1 and 2 respectively illustrate a schematic perspective view and a cross-sectional view of a honeycomb structure 100 that can be used as a wall-through type exhaust gas filter and/or a catalyst carrier for automobiles. The honeycomb structure 100 comprises an outer peripheral side wall 102 and partition walls 112 disposed on the inner peripheral side of the outer peripheral side wall 102, the partition walls 112 partitioning a plurality of parallel cells 108 forming flow paths from a first end surface 104 to a second end surface 106. The outer surface of the outer peripheral side wall 102 forms a side surface 103 of the honeycomb structure 100. In this honeycomb structure 100, both ends of each cell 108 are opened, and the exhaust gas that flows into one cell 108 from the first end surface 104 is purified while passing through the cell and flows out from the second end surface 106. It should be noted that, although the first end surface 104 is defined as the upstream side of the exhaust gas, and the second end surface 106 is defined as the downstream side of the exhaust gas, the distinction between the first end surface and the second end surface is for convenience, and the second end surface 106 may be on the upstream side of the exhaust gas, and the first end surface 104 may be on the downstream side of the exhaust gas.

Figure 3:
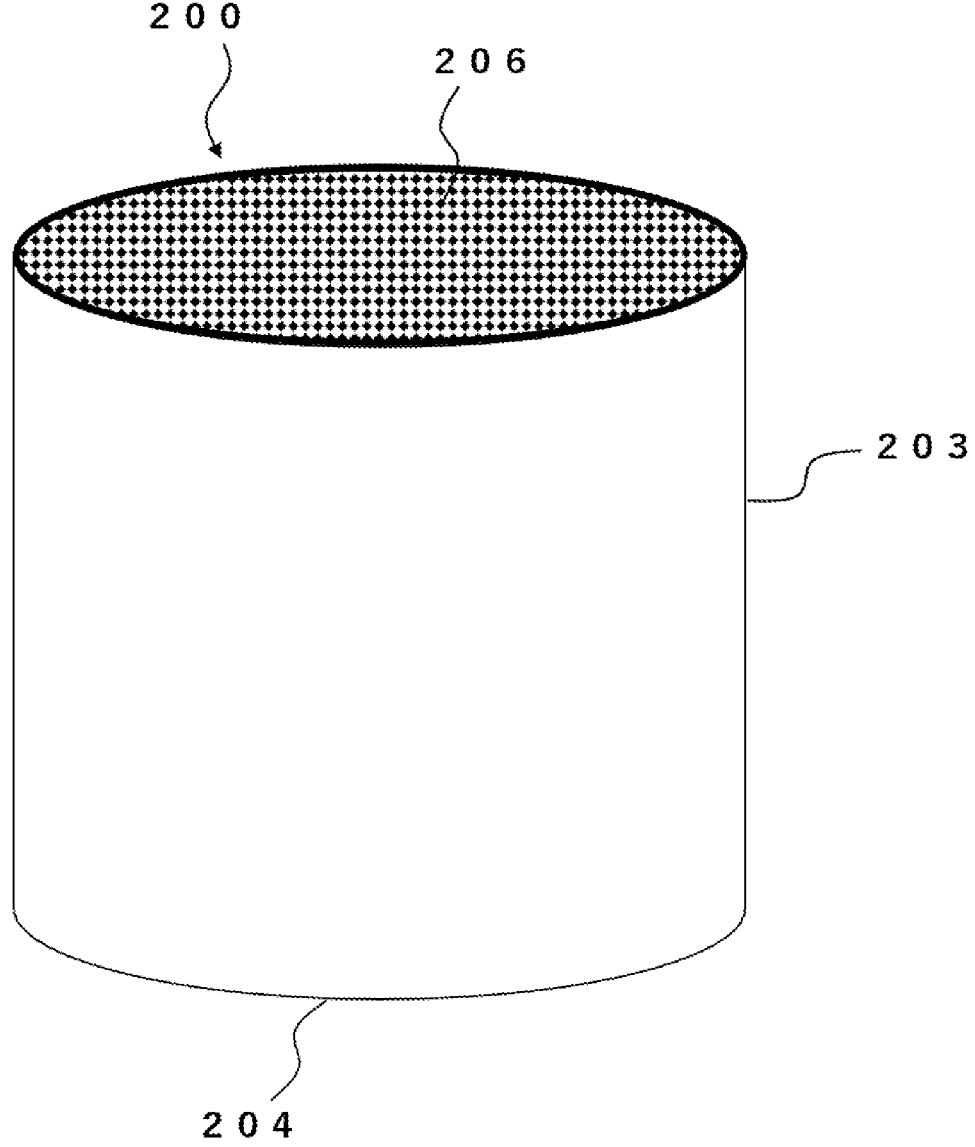
FIG. 3 is a perspective view schematically showing a wall-flow type honeycomb structure.
Figure 4:
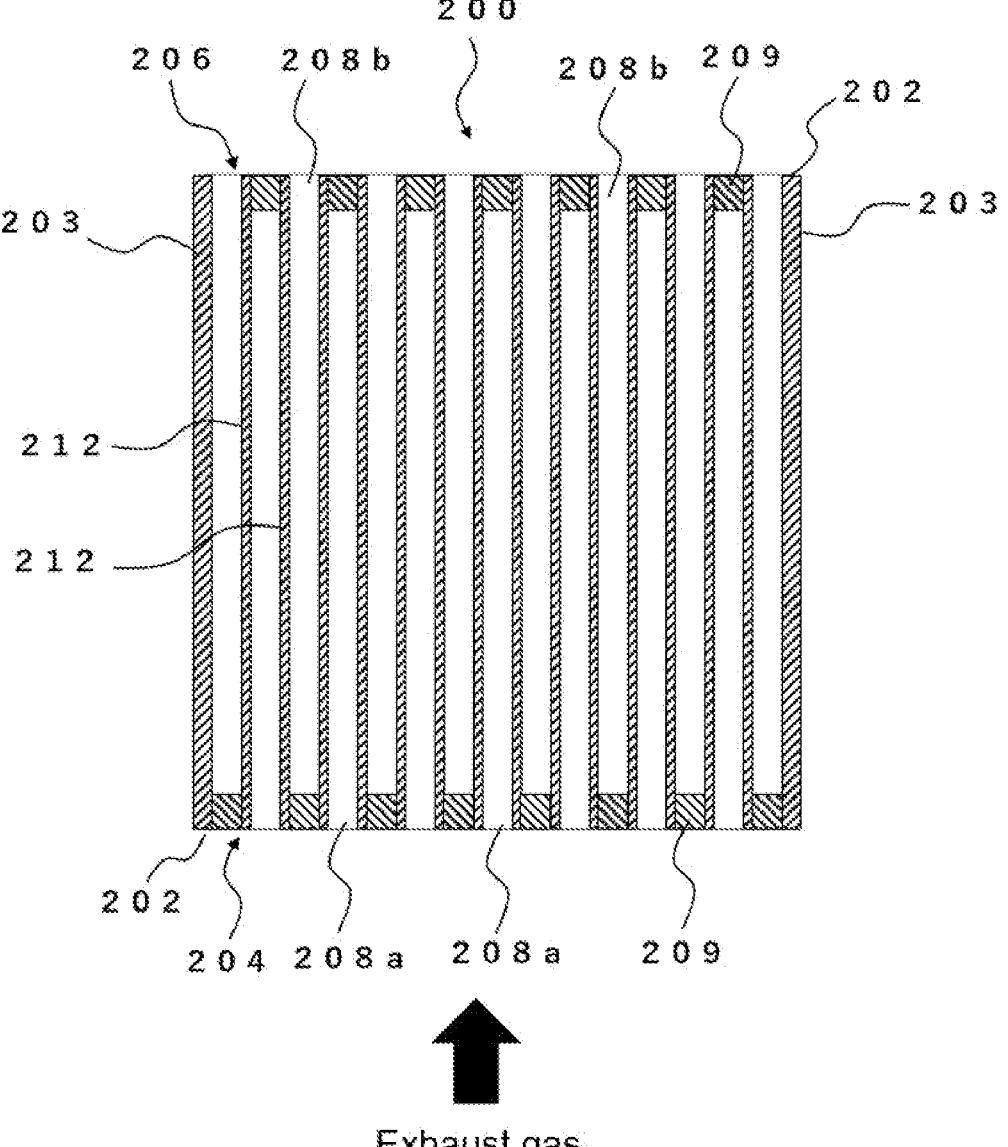
FIG. 4 is a schematic cross-sectional view of a wall-flow type honeycomb structure when observed in a cross-section parallel to the direction in which the cells extend.

FIGS. 3 and 4 respectively illustrate a schematic perspective view and a cross-sectional view of a honeycomb structure 200 that can be used as a wall-flow type exhaust gas filter and/or a catalyst carrier for automobiles. The honeycomb structure 200 comprises an outer peripheral side wall 202 and partition walls 212 disposed on the inner peripheral side of the outer peripheral side wall 202, the partition walls 212 partitioning a plurality of cells 208a and 208b forming flow paths from a first end surface 204 to a second end surface 206. The outer surface of the outer peripheral side wall 202 forms a side surface 203 of the honeycomb structure 200.

In the honeycomb structure 200, the plurality of cells 208a, 208b can be classified into a plurality of first cells 208a extending from the first end surface 204 to the second end surface 206, opening on the first end surface 204 and having sealing portions 209 on the second end surface 206; and a plurality of second cells 208b disposed inside the outer peripheral side wall 202, extending from the first end surface 204 to the second end surface 206, having sealing portions 209 on the first end surface 204 and opening on the second end surface 206. Further, in this honeycomb structure 200, the first cells 208a and the second cells 208b are alternately arranged adjacent to each other with partition walls 212 interposed therebetween.

When exhaust gas containing particulate matter such as soot is supplied to the first end surface 204 on the upstream side of the honeycomb structure 200, the exhaust gas is introduced into the first cells 208a and proceeds downstream within the first cells 208a. Since the first cells 208a have sealing portions 209 on the second end surface 206 on the downstream side, the exhaust gas passes through the partition walls 212 that partition the first cells 208a and the second cells 208b and flows into the second cells 208b. Since the particulate matter cannot pass through the partition walls 212, it is collected and deposited within the first cells 208a. After the particulate matter has been removed, the clean exhaust gas that has entered the second cells 208b travels downstream within the second cells 208b and exits from the second end surface 206 on the downstream side. It should be noted that, although the first end surface 204 is defined as the upstream side of the exhaust gas, and the second end surface 206 is defined as the downstream side of the exhaust gas, the distinction between the first end surface and the second end surface is for convenience, and the second end surface 206 may be on the upstream side of the exhaust gas, and the first end surface 204 may be on the downstream side of the exhaust gas.

The outer shape of the honeycomb structure can be, for example, a pillar shape. The shape of the end surfaces of the honeycomb structure is not limited, and for example, it may be a round shape such as a circular, elliptical, racetrack and elongated circular shape, a polygonal shape such as a triangular and quadrangle shape, and other irregular shapes. The illustrated honeycomb structures have a circular end surface shape and a cylindrical shape as a whole.

The height of the honeycomb structure (the length from the first end surface to the second end surface) is not particularly limited and may be appropriately set according to the application and required performance. The height of the honeycomb structure can be, for example, 40 mm to 450 mm. There is no particular limitation on the relationship between the height of the honeycomb structure and the maximum diameter of each end surface (referring to the maximum length among the diameters passing through the center of gravity of each end surface of the honeycomb structure). Therefore, the height of the honeycomb structure may be longer than the maximum diameter of each end surface, or the height of the honeycomb structure may be shorter than the maximum diameter of each end surface.

There is no particular restriction on the cell density (number of cells per unit cross-sectional area) of the honeycomb structure, and for example, it can be 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the total number of cells (including sealed cells) by the end surface area of one side of the honeycomb structure excluding the outer peripheral side wall.

The thickness of the partition walls in the honeycomb structure is preferably 210 μm or less, more preferably 150 μm or less, and even more preferably 100 μm or less, from the viewpoint of thinning the walls to reduce the pressure loss and lower the heat capacity. Further, from the viewpoint of ensuring strength, the thickness of the partition walls in the honeycomb structure is preferably 50 μm or more, more preferably 60 μm or more, and even more preferably 70 μm or more.

Figure 5:
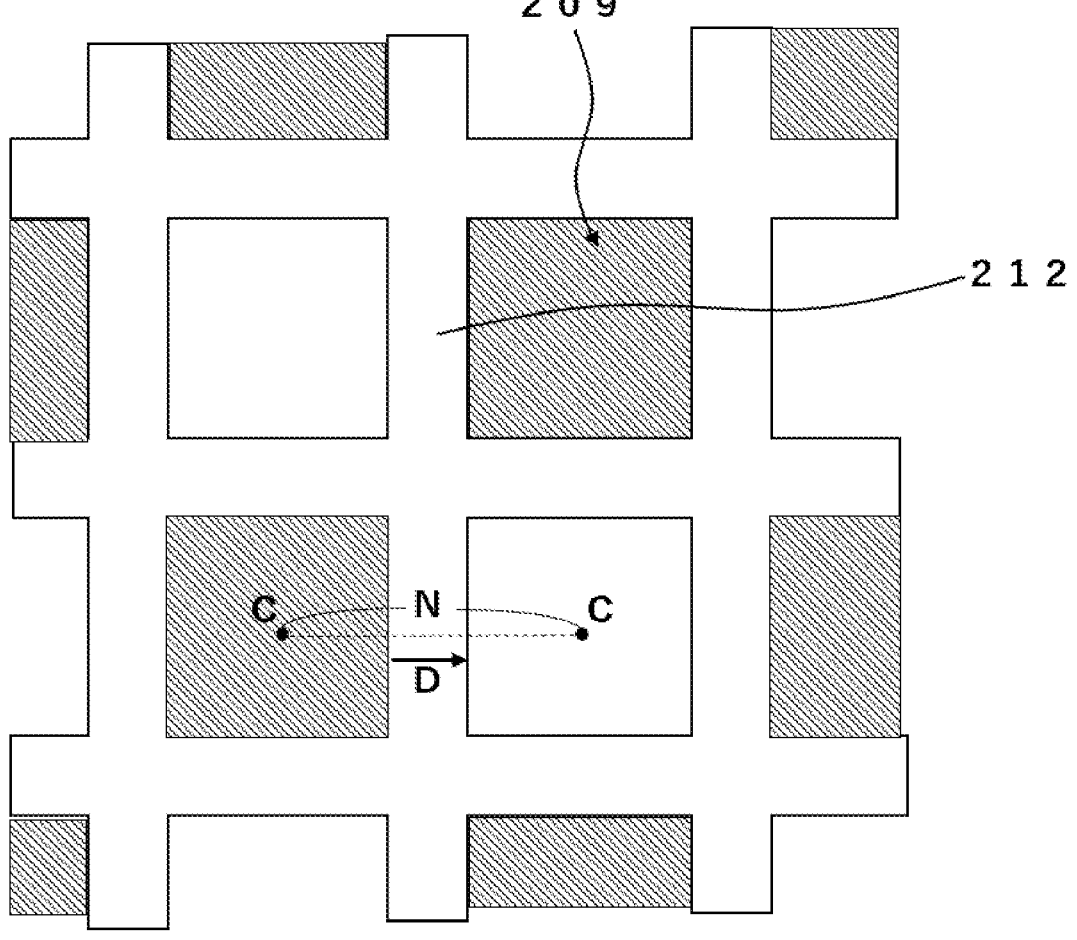
FIG. 5 is a schematic partial enlarged view of the partition walls of a wall-flow type honeycomb structure when observed in a cross-section orthogonal to the direction in which the cells extend.

FIG. 5 shows a schematic partial enlarged view of the partition walls 212 of the wall-flow type honeycomb structure 200 when observed in a cross-section perpendicular to the direction in which the cells extend. The thickness of the partition wall refers to a crossing length D of a line segment N that crosses the partition wall when the centers of gravity C of adjacent cells are connected by this line segment N in a cross-section orthogonal to the direction in which the cells extend (the height direction of honeycomb structure).

The porosity of the partition walls is preferably 45% or more, and more preferably 50% or more, from the viewpoint of increasing the porosity to suppress the pressure loss and lower the heat capacity. Further, from the viewpoint of ensuring the strength of the thin-walled honeycomb structure, the upper limit of the porosity of the partition walls is preferably 60% or less, and more preferably 55% or less. Therefore, the porosity of the partition walls is preferably 45 to 60%, more preferably 50 to 55%. The porosity is measured by mercury porosimetry using a mercury porosimeter. The mercury porosimetry is specified in JIS R1655: 2003. In this specification, partition wall samples of the honeycomb structure (cubes with length×width×height=approximately 13 mm×approximately 13 mm×approximately 13 mm) are taken from two locations at the center in the height direction, one near the center in the radial direction and the other near the outer periphery, and the porosity is measured by the mercury porosimetry, and the average value is taken as the measured value.

The material constituting the partition walls and the outer peripheral side wall of the honeycomb structure may be, but is not limited to, porous ceramics. As the ceramics, mention can be made to cordierite, mullite, zirconium phosphate, aluminum titanate, silicon carbide (SiC), silicon-silicon carbide composite (for example, Si-bonded SiC), cordierite-silicon carbide composite, zirconia, spinel, indialite, sapphirine, corundum, titania, silicon nitride, and the like. Further, one type of these ceramics may be contained alone, or two or more types may be contained.

It is preferable that the partition walls and the outer peripheral side wall of the honeycomb structure preferably comprises cordierite, from the viewpoint of high thermal shock resistance. The mass percentage occupied by cordierite in the honeycomb structure is preferably 50% by mass or more, preferably 70% by mass or more, and preferably 90% by mass or more. In a porous honeycomb structure containing cordierite, the mass percentage occupied by cordierite can be substantially 100% by mass, excluding inevitable impurities.

In the honeycomb structure, the raw material mixed in the raw material composition may remain. As will be described later, for crosslinked starch, a crosslinking agent containing P (phosphorus) may be used, but if the amount of crosslinking agent containing P increases, aggregates are likely to be formed in the green body, which tends to increase the extrusion molding pressure. Therefore, when the P content in the crosslinked starch used as the pore-forming material is low, the extrusion molding pressure can be lowered, and the P concentration remaining in the honeycomb structure is also low.

Therefore, in one embodiment, the P content in the honeycomb structure is less than 0.2% by mass, preferably 0.1% by mass or less, and more preferably 0.05% by mass or less. From the viewpoint of increasing the effect of lowering the extrusion molding pressure, the P content in the honeycomb structure may be 0.01% by mass or less, or even 0. However, starch crosslinked using a crosslinking agent containing P has a high effect of suppressing cell deformation during extrusion molding, and as a result, there is a high effect of improving the strength of the honeycomb structure. Therefore, in view of the balance with the effect of lowering the extrusion molding pressure, the P content in the honeycomb structure is preferably 0.01% by mass or more and less than 0.2% by mass, and more preferably 0.01% by mass or more and 0.05% by mass or less.

The P content in the honeycomb structure is determined by the following method. First, partition wall samples (0.5 to 5.0 g) are collected from the honeycomb structure from two locations at the center in the height direction: one near the center in the radial direction and the other near the outer periphery. A sample solution is prepared by adding sulfuric acid to each of the partition wall samples, which is then heated and ashed, and dissolved in hydrochloric acid. The sample solution is sprayed into high-temperature argon plasma generated by high-frequency energy. The emission intensity of the characteristic wavelength of the excited P atoms is measured using a sequential inductively coupled plasma optical emission spectrometer (ICP-OES/AES) and converted into the P content in the honeycomb structure. The average value of the P content in the honeycomb structure obtained from each partition wall sample is taken as the measured value.

One of the indexes of the mechanical strength of a honeycomb structure is isostatic breaking strength. In measuring the isostatic breaking strength of a honeycomb structure, a test is performed in which the honeycomb structure is submerged in water in a pressure vessel and isotropic pressure is applied to the honeycomb structure by gradually increasing the water pressure. The gradual increase in water pressure within the pressure vessel eventually causes breakage of the partition walls and outer peripheral side wall of the honeycomb structure. The value of pressure (rupture strength) when breakage occurs is isostatic breaking strength. Isostatic breaking strength is measured based on the automobile standard (JASO M505-87) published by the Society of Automotive Engineers of Japan.

In one embodiment, the honeycomb structure can have an isostatic breaking strength of 1.0 MPa or more despite having thin walls and high porosity. The isostatic breaking strength of the honeycomb structure is preferably 1.5 MPa or more, more preferably 2.0 MPa or more. Although the upper limit of the isostatic breaking strength is not particularly set, it is usually 3.0 MPa or less, and typically 2.5 MPa or less.

When using the honeycomb structure as a catalyst carrier, the surfaces of the partition walls can be coated with a catalyst depending on the purpose. One type of catalyst may be used alone, or two or more types may be used in combination. As to the catalyst, although not limited, mention can be made to a diesel oxidation catalyst (DOC) for oxidizing and burning hydrocarbons (HC) and carbon monoxide (CO) to increase exhaust gas temperature, a PM combustion catalyst that assists in the combustion of PM such as soot, an SCR catalyst and an NSR catalyst that remove nitrogen oxides (NOx), as well as a three-way catalyst that can simultaneously remove hydrocarbons (HC), carbon monoxide (CO), and nitrogen oxides (NOx). The catalyst may contain as appropriate, for example, noble metals (Pt, Pd, Rh, and the like), alkali metals (Li, Na, K, Cs, and the like), alkaline earth metals (Mg, Ca, Ba, Sr, and the like.), rare earths (Ce, Sm, Gd, Nd, Y, La, Pr, and the like), transition metals (Mn, Fe, Co, Ni, Cu, Zn, Sc, Ti, Zr, V, Cr, and the like), and the like.

<2. Method for Manufacturing Honeycomb Structure>

A method for manufacturing a honeycomb structure according to an embodiment of the present invention will be exemplified as below.

(2-1. Preparation of Honeycomb Formed Body)

First, a raw material composition containing a ceramic raw material, a pore-forming material, a binder, and a dispersion medium is kneaded to form a green body, and by extruding the green body through a die that defines the opening shapes of a plurality of cells, it is possible to prepare a honeycomb structure having an outer peripheral side wall and a plurality of cells having a first end surface and a second end surface disposed on the inner peripheral side of the outer peripheral side wall, both the first end surface and the second end surface having openings. Additives such as a dispersant may be added to the raw material composition as necessary. For extrusion molding, a die having a desired overall shape, cell shape, partition wall thickness, cell density, and the like can be used.

The ceramic raw material is the raw material for the part that remains after firing and forms the skeleton of the honeycomb structure as a ceramic. As the ceramic raw material, a raw material that can form the above-mentioned ceramics after firing can be used. The ceramic raw material can be provided in the form of a powder, for example. Examples of ceramic raw materials include raw materials for obtaining ceramics such as cordierite, mullite, zircon, aluminum titanate, silicon carbide, silicon nitride, zirconia, spinel, indialite, sapphirine, corundum, and titania. Specific examples include, but are not limited to, silica, talc, alumina, kaolin, serpentine, pyroferrite, brucite, boehmite, mullite, magnesite, aluminum hydroxide, and the like. The ceramic raw materials may be used alone or in combination of two or more.

Cordierite can be suitably used as the ceramics. In this case, a cordierite-forming raw material can be used as the ceramic raw material. The cordierite-forming raw material is a raw material that becomes cordierite by firing. As the cordierite-forming raw material, talc, kaolin, alumina, aluminum hydroxide, silica, and the like can be used. It is desirable that the cordierite-forming raw material has a chemical composition of alumina ($Al_2O_3$) (including aluminum hydroxide that converts to alumina): 30 to 45% by mass, magnesia (MgO): 11 to 17% by mass, and silica ($SiO_2$): 42 to 57% by mass.

Since ceramic raw materials, including the cordierite-forming raw material, affect the strength of the honeycomb structure, it is preferable to use raw materials whose particle size has been adjusted by pulverization, sieving, or the like. Specifically, in the volume-based cumulative particle size distribution measured by a laser diffraction/scattering method, the lower limit of the cumulative 50% particle diameter (D50) from the small particle side of each ceramic raw material is preferably 0.1 μm or more, more preferably 0.5 μm or more, and even more preferably 1.0 μm or more. Further, the upper limit of the cumulative 50% particle diameter (D50) from the small particle side of each ceramic raw material is preferably 30 μm or less, more preferably 20 μm or less, and even more preferably 15 μm or less. Therefore, for example, the cumulative 50% particle diameter (D50) of each ceramic raw material is preferably 0.1 μm or more and 30 μm or less, more preferably 0.5 μm or more and 20 μm or less, and even more preferably 1.0 μm or more and 15 μm or less.

As the pore-forming material, when crosslinked starch and acrylic polymer are used together, the fluidity of the green body is significantly improved. This improves the moldability, and suppresses cell deformation that tends to occur during molding, and as a result, the strength of the honeycomb structure can be increased. In order to reduce the wall thickness of the honeycomb structure, it is necessary to extrude the green body through an extremely narrow die slot, which, which is accompanied with an increase in extrusion molding pressure, and tends to cause distortion of the cell shape (cell deformation). The reason why cell deformation is suppressed by using crosslinked starch and acrylic polymer together as the pore-forming material is not necessarily clear. Although the present invention is not intended to be limited by any theory, it is presumed that the water retention effect of the crosslinked starch and acrylic polymer leads to improved moldability. Compared to the cases where only either one of crosslinked starch and acrylic polymer is used, remarkable effects can be obtained when both are used in combination.

In the crosslinked starch, some hydroxyl groups between starch molecules are crosslinked by using one or more crosslinking agents such as formalin, epichlorohydrin, and phosphate. Examples of the crosslinked starch include acetylated distarch adipate, acetylated distarch phosphate, hydroxypropyl distarch phosphate, phosphated distarch phosphate, and distarch phosphate. As the crosslinked starch, one type may be used alone, and two or more types may be used in combination.

Accordingly, the crosslinked starch may contain phosphorus (P). Further, crosslinked starch containing P is preferable from the viewpoint of achieving high porosity while obtaining the effect of improving the strength of the honeycomb structure. However, when the P content in crosslinked starch increases, the screen used to remove impurities during extrusion molding of green body becomes clogged, causing an increase in extrusion molding pressure. Therefore, it is desirable to control the P content in the green body within a range that does not cause screen clogging.

The extrusion molding pressure when extruding the green body is preferably 15 MPa or less, more preferably 10 MPa or less. Although a lower extrusion molding pressure is preferable, from the viewpoint of ensuring strength, a green body that can be extruded at an excessively low extrusion molding pressure cannot be used. For this reason, the extrusion molding pressure is preferably 1 MPa or more, more preferably 3 MPa or more. Therefore, the extrusion molding pressure is preferably, for example, 1 to 15 MPa, more preferably 3 to 10 MPa.

Therefore, it is desirable that the green body contains an acrylic polymer and also crosslinked starch with the proviso that the P content is less than 0.2 parts by mass, preferably with the proviso that the P content is less than 0.1 parts by mass, and more preferably with the proviso that the P content is less than 0.05 parts by mass, with respect to 100 parts by mass of the ceramic raw material. The P content in the green body may be 0.01 parts by mass or less, or even 0 parts by mass, with respect to 100 parts by mass of the ceramic raw material. From the viewpoint of achieving high porosity while obtaining the effect of improving the strength of the honeycomb structure, the lower limit of the content of crosslinked starch in the green body is preferably 1 part by mass or more, more preferably 5 parts by mass or more, and even more preferably 10 parts by mass or more, with respect to 100 parts by mass of the ceramic raw material, while satisfying the above preferable conditions for P content. From the viewpoint of suppressing the occurrence of cracks due to heat generation during firing, the upper limit of the content of crosslinked starch in the green body is preferably 50 parts by mass or less, more preferably 30 parts by mass or less, and even more preferably 20 parts by mass or less, with respect to 100 parts by mass of the ceramic raw material.

When using starch crosslinked with a crosslinking agent containing P, even if the content of crosslinked starch in the green body is the same, since the P content increases as the degree of crosslinking increases, the P content can be used as an index of the degree of crosslinking. For example, as the crosslinked starch, one having the P content of 0.01 parts by mass or more and less than 0.20 parts by mass per 10 parts by mass of the crosslinked starch can be used. The P content in the crosslinked starch per 10 parts by mass is preferably 0.01 parts by mass or more and less than 0.15 parts by mass, and more preferably 0.01 parts by mass or more and less than 0.1 parts by mass.

The P content in the green body is measured by the following method. First, a sample (0.5 to 5.0 g) is collected from the green body. A sample solution is prepared by adding sulfuric acid to each of the partition wall samples, which is then heated, ashed, and dissolved in hydrochloric acid. The sample solution is sprayed into high-temperature argon plasma generated by high-frequency energy. The emission intensity of the characteristic wavelength of the excited P atoms is measured using a sequential inductively coupled plasma optical emission spectrometer (ICP-OES/AES) and converted into the P content in the green body.

From the viewpoint of achieving high porosity while obtaining the effect of improving the strength of the honeycomb structure, the green body preferably contains 0.5 parts by mass or more of an acrylic polymer, more preferably 0.7 parts by mass or more of an acrylic polymer, and even more preferably 1.0 parts by mass or more of an acrylic polymer, with respect to 100 parts by mass of the ceramic raw material. In addition, from the viewpoint of fluidity, the green body preferably contains 10.0 parts by mass or less of an acrylic polymer, more preferably 7.0 parts by mass or less of an acrylic polymer, and even more preferably 5.0 parts by mass or less of an acrylic polymer, with respect to 100 parts by mass of the ceramic raw material. Therefore, for example, it is preferable that the green body contain 0.5 parts by mass or more and 10 parts by mass or less of an acrylic polymer, more preferably to contain 0.7 to 7.0 parts by mass of acrylic polymer, and even more preferably to contain 1.0 to 5.0 parts by mass of acrylic polymer, with respect to 100 parts by mass of the ceramic raw material.

Types of acrylic polymers include, but are not limited to, polyacrylic acid, polymethacrylic acid, polyacrylic acid ester, polymethacrylic acid ester, and the like. In particular, polymethyl methacrylate (PMMA) is a suitable acrylic polymer. The acrylic polymer may be crosslinked. As the acrylic polymer, one type may be used alone, or two or more types may be used in combination.

One or more other known pore-forming materials may be appropriately added to the green body. Examples thereof include organic pore-forming materials such as wheat flour, foamed resin, water-absorbing resin, uncrosslinked starch, porous silica, carbon (for example, graphite), ceramic balloons, polyethylene, polystyrene, polypropylene, nylon, polyester, phenol, and the like.

Pore-forming materials such as crosslinked starch and acrylic polymer affect the strength of the honeycomb structure, so it is preferable to use materials whose particle size has been adjusted by pulverization, sieving, and the like. Specifically, in the volume-based cumulative particle size distribution measured by a laser diffraction/scattering method, the lower limit of the cumulative 50% particle diameter (D50) from the small particle side of each pore-forming material is preferably 0.1 μm or more, more preferably 1.0 μm or more, and even more preferably 5.0 μm or more. Further, the upper limit of the cumulative 50% particle diameter (D50) from the small particle side of each pore-forming material is preferably 30.0 μm or less, more preferably 20.0 μm or less, and even more preferably 15.0 μm or less. Therefore, for example, the cumulative 50% particle diameter (D50) from the small particle side of each pore-forming material is preferably 0.1 to 30.0 μm, more preferably 1.0 to 20.0 μm, and even more preferably 5.0 to 15.0 μm.

As the binder, examples include organic binders such as methyl cellulose, hydroxypropyl methyl cellulose, hydroxyethyl cellulose, carboxymethyl cellulose, and polyvinyl alcohol. In particular, it is suitable to use methyl cellulose and hydroxypropyl methyl cellulose in combination. Further, from the viewpoint of increasing the strength of the honeycomb formed body, the content of the binder in the green body is preferably 4 parts by mass or more, more preferably 5 parts by mass or more, and even more preferably 6 parts by mass or more, with respect to 100 parts by mass of the ceramic raw material. From the viewpoint of suppressing the occurrence of crack due to abnormal heat generation in a firing step, the content of the binder in the green body is preferably 9 parts by mass or less, more preferably 8 parts by mass or less, and even more preferably 7 parts by mass or less, with respect to 100 parts by mass of the ceramic raw material. As the binder, one type may be used alone, and two or more types may be used in combination.

Examples of the dispersion medium include water or a mixed solvent of water and an organic solvent such as alcohol, and water can be particularly preferably used. The content of the dispersion medium in the green body is preferably 30 to 70 parts by mass, more preferably 35 to 65 parts by mass, and even more preferably 40 to 60 parts by mass, with respect to 100 parts by mass of the ceramic raw material. When the content of the dispersion medium in the green body is 30 parts by mass or more with respect to 100 parts by mass of the ceramic raw material, it is easy to obtain the advantage that the quality of the honeycomb formed body is readily stabilized. When the content of the dispersion medium in the green body is 70 parts by mass or less with respect to 100 parts by mass of the ceramic raw material, the amount of shrinkage during drying becomes small and deformation can be suppressed. In this specification, the water content of the green body refers to a value measured by a loss on drying method.

As the dispersant, ethylene glycol, dextrin, fatty acid soap, polyether polyol, and the like can be used. As the dispersant, one type may be used alone, and two or more types may be used in combination. The content of the dispersant in the green body is preferably 0 to 2 parts by mass with respect to 100 parts by mass of the ceramic raw material.

(2-2. Drying of Honeycomb Formed Body)

Next, the honeycomb formed body is dried to obtain a honeycomb dried body. In the drying step, conventionally known drying methods such as hot wind drying, microwave drying, dielectric drying, reduced pressure drying, vacuum drying, and freeze drying can be used. Among these, a drying method that combines hot wind drying with microwave drying or dielectric drying is preferable since the entire formed body can be dried quickly and uniformly. Further, a batch type dryer or a continuous type dryer may be used.

When sealing portions are formed, the sealing portions are formed at predetermined positions on the first end surface and the second end surface of the dried honeycomb formed body, and then the sealing portions are dried. The method of sealing the first end surface and the second end surface of the honeycomb formed body is not particularly limited, and any known method may be employed. There are no particular restrictions on the material of the sealing portions, but from the viewpoint of strength and heat resistance, ceramics are preferred. As the ceramics, a ceramic material containing at least one selected from the group consisting of cordierite, mullite, zircon, aluminum titanate, silicon carbide, silicon nitride, zirconia, spinel, indialite, sapphirine, corundum, and titania is preferable. It is even more preferable that the sealing portions have the same material composition as the main body portion of the honeycomb formed body, since the expansion coefficient during firing can be made the same, leading to improved durability.

(2-3. Firing of Honeycomb Dried Body)

After drying the honeycomb formed body, a pillar-shaped honeycomb structure can be manufactured by performing degreasing and firing. As the conditions for the degreasing step and the firing step, known conditions may be adopted depending on the material composition of the honeycomb formed body. Although no particular explanation is required, specific examples of conditions are listed below.

The degreasing step will be explained. The combustion temperature of the binder is about 200° C., and the combustion temperature of the pore-forming material is about 300 to 1000° C. Therefore, the degreasing step may be carried out by heating the honeycomb formed body to a temperature in the range of about 200 to 1000° C. The heating time is not particularly limited, but is usually about 10 to 100 hours. The honeycomb formed body after the degreasing process is called a calcined body.

The firing step can be carried out, for example, by heating the calcined body to 1350 to 1600° C. and holding it for 3 to 10 hours, although it depends on the material composition of the honeycomb formed body.

When using the honeycomb structure as a catalyst carrier, the catalyst can be carried on the partition walls. There are no particular restrictions on the method of carrying the catalyst on the porous partition walls, and any known method may be used, and examples thereof include a method of bringing a catalyst composition slurry into contact with the porous partition walls, followed by drying and firing. The catalyst composition slurry preferably contains one type or a combination of two or more types of appropriate catalysts, depending on its use.

EXAMPLES

Hereinafter, Examples will be illustrated to better understand the present invention and its advantages, but the present invention is not limited to the Examples.

<A. Manufacture of Honeycomb Structures According to Examples and Comparative Examples>

(1) Raw Materials

As the cordierite-forming raw material, talc, kaolin, alumina, aluminum hydroxide, and silica were prepared. The volume-based cumulative 50% particle diameter (D50) of these measured by the laser diffraction/scattering method are shown in Table 1.

As the pore-forming materials, acrylic polymer, low crosslinked starch, medium crosslinked starch, and high crosslinked starch were prepared. As the acrylic polymer, polyacrylic acid was used. The low crosslinked starch, medium crosslinked starch, and high crosslinked starch were all starches crosslinked with a phosphoric acid-based crosslinking agent, but they had different degrees of crosslinking. The volume-based cumulative 50% particle diameter (D50) of these measured by the laser diffraction/scattering methods are shown in Table 1.

A binder, a dispersant, and water were prepared as aids. Methyl cellulose was used as the binder, and ethylene glycol was used as the dispersant.

(2) Preparation of Honeycomb Formed Body

A raw material composition in which the above-mentioned cordierite-forming raw material, pore-forming material, and aids were blended in the mass ratio shown in Table 1 according to the number of Examples and Comparative Examples was kneaded, thereby forming the green body of respective Examples and Comparative Examples. Table 1 shows the P content with respect to 100 parts by mass of the ceramic raw material in the green body, which was measured according to the method described above.

Thereafter, each green body was put into an extrusion molding machine and extruded through a die with a predetermined shape to obtain a cylindrical honeycomb formed body. The pressure during the extrusion molding (extrusion molding pressure) was measured using a pressure sensor. The results are shown in Table 1. After dielectrically drying and hot wind drying the obtained honeycomb formed body, both end surfaces were cut to a predetermined size and further hot wind drying was performed at 70° C. for 2 hours.

(3) Firing

Next, honeycomb structures according to the Examples and the Comparative Examples were obtained by heating and degreasing at about 200° C. in an air atmosphere and then firing at 1400° C. for 10 hours in an air atmosphere. A number of the honeycomb structures were manufactured as required for the following tests.

(4) Specifications of Honeycomb Structure

The specifications of the obtained honeycomb structure were as follows.

Overall shape: cylindrical shape with diameter 100 mm×height 100 mm

Cell shape in cross-section perpendicular to cell flow path direction: square

Partition wall thickness (nominal value based on the specifications of the die): Listed in Table 1

Cell density (number of cells per unit cross-sectional area): Listed in Table 1 (cpsi: cell/square inch)

<B. Characteristic Evaluation>

Various characteristic evaluations were performed on each honeycomb structure according to the Examples and the Comparative Examples obtained above.

(1) Porosity

Partition wall samples (length×width×height=approximately 13 mm×approximately 13 mm×approximately 13 mm cube) of each honeycomb structure were collected from two locations at the center in the height direction: one was near the radial center and the other was near the outer periphery. The porosity was measured by mercury porosimetry, and the average value was taken as the measured value. The results are shown in Table 1.

(2) Measurement of Isostatic Breaking Strength

The isostatic breaking strength of each honeycomb structure was measured based on the automobile standard (JASO M505-87) published by the Society of Automotive Engineers of Japan. The results are shown in Table 1.

(3) Measurement of P Content

The P content in each honeycomb structure was measured according to the measurement method described above. The results are shown in Table 1.

TABLE 1

| | | | | | | | | | | | |
|---|---|---|---|---|---|---|---|---|---|---|---|
| | Honeycomb structure raw material (green body) | | | | | | | | | | |
| | Cordierite-forming raw material (parts by mass) | | | | | Pore-forming material (parts by mass) | | | | | |
| | | | | | | Name of component | | | | | |
| | Talc | Kaolin | Alumina | Aluminum hydroxide | Silica | Acrylic polymer | Low crosslinked starch | Medium crosslinked starch | High crosslinked starch | P content | |
| | | | | | | Particle size D50 (μm) | | | | | |
| | 10 | 5 | 5 | 3 | 5 | 25 | 10 | 10 | 10 | — | |
| Comparative Example 1 | 40 | 20 | 15 | 15 | 10 | 2.5 | | | | <0.01 | |
| Comparative Example 2 | 40 | 10 | 15 | 15 | 20 | 4.5 | | | | <0.01 | |
| Comparative Example 3 | 40 | 20 | 15 | 15 | 10 | | 15 | | | 0.035 | |
| Comparative Example 4 | 40 | 20 | 15 | 15 | 10 | | 25 | | | 0.070 | |
| Comparative Example 5 | 40 | 30 | 15 | 15 | 0 | | | | 20 | 0.220 | |
| Comparative Example 6 | 40 | 10 | 15 | 15 | 20 | | | | 20 | 0.200 | |

TABLE 1-continued

| | | | | | | | | | | P content |
|---|---|---|---|---|---|---|---|---|---|---|
| Example 1 | 40 | 20 | 15 | 15 | 10 | 2.5 | 1 | | | <0.01 |
| Example 2 | 40 | 20 | 15 | 15 | 10 | 1.5 | 5 | | | <0.01 |
| Example 3 | 40 | 30 | 15 | 15 | 0 | 0.5 | 10 | | | 0.018 |
| Example 4 | 40 | 30 | 15 | 15 | 0 | 0.5 | 20 | | | 0.052 |
| Example 5 | 40 | 20 | 15 | 15 | 10 | 1.5 | | | 5 | 0.054 |
| Example 6 | 40 | 30 | 15 | 15 | 0 | 0.5 | | | 10 | 0.130 |
| Example 7 | 40 | 10 | 15 | 15 | 20 | 2.5 | 5 | | | <0.01 |
| Example 8 | 40 | 20 | 15 | 15 | 10 | 4.5 | 5 | | | <0.01 |
| Example 9 | 40 | 20 | 15 | 15 | 10 | 1.5 | 10 | | | 0.022 |
| Example 10 | 40 | 10 | 15 | 15 | 20 | 1.0 | 25 | | | 0.062 |
| Example 11 | 40 | 10 | 15 | 15 | 20 | 2.5 | | 5 | | 0.018 |
| Example 12 | 40 | 10 | 15 | 15 | 20 | 1.5 | | 10 | | 0.053 |
| Example 13 | 40 | 10 | 15 | 15 | 20 | 0.5 | | 20 | | 0.087 |
| Example 14 | 40 | 10 | 15 | 15 | 20 | 2.5 | | | 5 | 0.068 |
| Example 15 | 40 | 0 | 15 | 20 | 25 | 5.0 | | | 5 | 0.064 |
| Example 16 | 40 | 10 | 15 | 15 | 20 | 1.5 | | | 10 | 0.140 |

| | Honeycomb structure raw material (green body) Aids (parts by mass) Name of component | | | Formability Extrusion | Honeycomb structure | | | | | |
|---|---|---|---|---|---|---|---|---|---|---|
| | Binder | Dispersant | Water | molding pressure | Partition wall thickness | | Cell density | Porosity | Strength | P content |
| | Particle size D50 (μm) | | | | | | | | | |
| | — | — | — | (MPa) | (mil) | (μm) | (cpsi) | (%) | (MPa) | (mass %) |
| Comparative Example 1 | 8 | 1 | 40 | 2.0 | 2 | 50.8 | 900 | 45.9 | 0.85 | <0.01 |
| Comparative Example 2 | 8 | 1 | 65 | 1.4 | 2 | 50.8 | 900 | 54.5 | 0.33 | <0.01 |
| Comparative Example 3 | 8 | 1 | 35 | 5.8 | 2 | 50.8 | 900 | 45.2 | 0.64 | 0.035 |
| Comparative Example 4 | 8 | 1 | 55 | 8.2 | 2 | 50.8 | 900 | 53.1 | 0.57 | 0.070 |
| Comparative Example 5 | 8 | 1 | 35 | 16.0 | 2 | 50.8 | 900 | 48.9 | 2.57 | 0.220 |
| Comparative Example 6 | 8 | 1 | 40 | 15.5 | 2 | 50.8 | 900 | 54.9 | 1.77 | 0.200 |
| Example 1 | 8 | 1 | 40 | 1.4 | 2 | 50.8 | 900 | 46.5 | 1.67 | <0.01 |
| Example 2 | 8 | 1 | 40 | 1.6 | 6 | 152.4 | 400 | 47.0 | 1.73 | <0.01 |
| Example 3 | 8 | 1 | 35 | 5.8 | 2 | 50.8 | 900 | 47.0 | 2.54 | 0.018 |
| Example 4 | 8 | 1 | 35 | 7.8 | 2 | 50.8 | 900 | 49.8 | 2.04 | 0.052 |
| Example 5 | 8 | 1 | 42 | 7.0 | 6 | 152.4 | 900 | 47.0 | 2.24 | 0.054 |
| Example 6 | 8 | 1 | 35 | 14.1 | 2 | 50.8 | 400 | 47.0 | 2.20 | 0.130 |
| Example 7 | 8 | 1 | 55 | 2.6 | 2 | 50.8 | 900 | 54.1 | 1.33 | <0.01 |
| Example 8 | 8 | 1 | 55 | 2.6 | 4 | 101.6 | 400 | 59.8 | 1.38 | <0.01 |
| Example 9 | 8 | 1 | 50 | 4.8 | 2 | 50.8 | 900 | 55.4 | 1.54 | 0.022 |
| Example 10 | 8 | 1 | 40 | 7.5 | 2 | 50.8 | 900 | 58.8 | 1.32 | 0.062 |
| Example 11 | 8 | 1 | 55 | 5.5 | 2 | 50.8 | 900 | 55.2 | 1.54 | 0.018 |
| Example 12 | 8 | 1 | 50 | 9.4 | 8 | 203.2 | 300 | 55.3 | 1.69 | 0.053 |
| Example 13 | 8 | 1 | 40 | 11.9 | 2 | 50.8 | 900 | 53.0 | 1.73 | 0.087 |
| Example 14 | 8 | 1 | 55 | 11.3 | 2 | 50.8 | 900 | 54.2 | 1.67 | 0.068 |
| Example 15 | 8 | 1 | 55 | 11.3 | 6 | 152.4 | 400 | 59.4 | 1.31 | 0.064 |
| Example 16 | 8 | 1 | 50 | 14.0 | 2 | 50.8 | 900 | 55.4 | 1.97 | 0.140 |

The honeycomb structures according to the Examples and the Comparative Examples all had thin walls and high porosity. Comparative Examples 1 to 6 are examples in which only one of the acrylic polymer and crosslinked starch was used as the pore-forming material. In Comparative Examples 1 to 4, the strength of the honeycomb structures was not sufficient. Comparative Examples 5 and 6 using high crosslinked starch had excellent strength, but the extrusion speed decreased significantly due to the high P content and resulting high extrusion molding pressure, and the molding machine was overburdened.

On the other hand, in Examples 1 to 16, by using acrylic polymer and crosslinked starch together as the pore-forming material, a honeycomb structure with thin walls and high porosity and excellent strength could be manufactured without placing an excessive burden on the extrusion molding machine (extrusion molding pressure was 15 MPa or less).

DESCRIPTION OF REFERENCE NUMERALS

100: Honeycomb structure
102: Outer peripheral side wall
103: Side surface
104: First end surface
106: Second end surface
108: Cell
112: Partition wall
200: Honeycomb structure
202: Outer peripheral side wall
203: Side surface
204: First end surface
206: Second end surface
208a: First cell
208b: Second cell
209: Sealing portion
212: Partition wall

The invention claimed is:

1. A method for manufacturing a honeycomb structure comprising an outer peripheral side wall and partition walls disposed on an inner peripheral side of the outer peripheral side wall, the partition walls partitioning a plurality of cells forming flow paths from a first end surface to a second end surface, the method comprising:

preparing a honeycomb formed body by extruding a green body comprising a ceramic raw material, a pore-forming material, a binder, and a dispersion medium through a die that defines opening shapes of the plurality of cells;

drying the honeycomb formed body to obtain a honeycomb dried body; and firing the honeycomb dried body to obtain a honeycomb fired body in which a thickness of the partition walls is 50 μm or more and 210 μm or less, and a porosity of the partition walls is 45% to 60%;

wherein the pore-forming material in the green body comprises a crosslinked starch and an acrylic polymer, and the green body comprises 1.0 parts by mass or more of the crosslinked starch with the proviso that a P content in the green body is less than 0.2 parts by mass, with respect to 100 parts by mass of the ceramic raw material.

2. The method according to claim 1, wherein the green body comprises 1.0 parts by mass or more of the crosslinked starch with the proviso that the P content in the green body is 0.1 parts by mass or less, with respect to 100 parts by mass of the ceramic raw material.

3. The method according to claim 1, wherein the green body comprises 1.0 parts by mass or more of the crosslinked starch with the proviso that the P content in the green body is 0.05 parts by mass or less, with respect to 100 parts by mass of the ceramic raw material.

4. The method according to claim 1, wherein the P content in the honeycomb structure is less than 0.2% by mass.

5. The method according to claim 1, wherein the P content in the honeycomb structure is 0.1% by mass or less.

6. The method according to claim 1, wherein the P content in the honeycomb structure is 0.05% by mass or less.

7. The method according to claim 1, wherein the green body comprises 0.5 parts by mass or more of the acrylic polymer with respect to 100 parts by mass of the ceramic raw material.

8. The method according to claim 1, wherein the ceramic raw material is a cordierite-forming raw material.

* * * * *